United States Patent [19]

Brown, III et al.

[11] Patent Number: 5,450,349

[45] Date of Patent: Sep. 12, 1995

[54] COMPUTER SYSTEM PERFORMANCE EVALUATION SYSTEM AND METHOD

[75] Inventors: John F. Brown, III, Northborough; G. Michael Uhler, Marlborough; Richard L. Sites, Boylston, all of Mass.

[73] Assignee: Digital Equipment Corporation, Maynard, Mass.

[21] Appl. No.: 967,110

[22] Filed: Oct. 27, 1992

[51] Int. Cl.6 ............................................. G06F 11/22
[52] U.S. Cl. ...................... 395/183.03; 395/183.15; 395/185.1; 395/183.22; 370/44; 371/22.1; 364/551.01
[58] Field of Search ............. 364/551.01, 152, 578; 395/375, 600, 575, 775; 371/16.1, 24; 370/44, 93

[56] References Cited

U.S. PATENT DOCUMENTS

| | | | |
|---|---|---|---|
| 4,122,519 | 10/1978 | Bielawski et al. | 395/600 |
| 4,435,759 | 3/1984 | Baum et al. | 364/200 |
| 4,485,440 | 11/1984 | Duff et al. | 364/300 |
| 4,488,227 | 12/1984 | Miu et al. | 395/375 |
| 4,498,132 | 2/1985 | Ahlstrom et al. | 395/775 |
| 4,499,535 | 2/1985 | Bachman et al. | 395/375 |
| 4,562,538 | 12/1985 | Berenbaum et al. | 395/575 |
| 4,622,538 | 11/1986 | Whynacht et al. | 364/551.01 |
| 4,905,171 | 2/1990 | Kiel et al. | 364/551.01 |
| 5,084,876 | 1/1992 | Welham et al. | 364/578 |

*Primary Examiner*—Ellis B. Ramirez
*Assistant Examiner*—Thomas Peeso
*Attorney, Agent, or Firm*—Diane C. Drozenski; Denis G. Maloney; Arthur W. Fisher

[57] ABSTRACT

A system for evaluating the performance of a computer system having a processor that passes through a plurality of processor states during operation and an associated system memory includes an operating unit for receiving a request to monitor specific process states from a user. Firmware causes the processor to enter the desired processor state requested by the user. The hardware identifies the occurrence of the desired processor state. Information relating to the occurrence of the desired process state is accumulated the memory. The accumulated information is read from memory and a report is provided to the user.

8 Claims, 3 Drawing Sheets

COMPUTER SYSTEM PERFORMANCE EVALUATION SYSTEM AND METHOD

FIELD OF THE INVENTION

The present invention relates to the field of empirically evaluating the performance of computer systems. More particularly, the invention provides a system and method for identifying the occurrence of specified process states in a computer system. The data obtained can be used subsequently to evaluate performance of the computer system.

BACKGROUND OF THE INVENTION

The complex problem of analyzing and understanding the dynamic behavior of computer systems is aided by the use of data collected by performance monitoring hardware associated with the system processor. Unfortunately, thorough analysis requires monitoring coverage of such a vast breadth of processor states that hardware support is unrealistic. Moreover, as computer designs increase in complexity, their dynamic behavior becomes less intuitive, causing computer designers to rely more heavily on empirical data to analyze system behavior and to provide a basis for making hardware and software design decisions.

In the past, most of the processor states that are useful for performing system analyses have been accessible to external instrumentation because of the implementation technology. At low levels of integration, most machine state, bus transactions and other signals were visible on the module interconnect, edge connectors and backplanes. Thus, data could be easily captured and post-processed for use in system analysis.

As more and more logic is integrated onto VLSI chips, many relevant system events are no longer accessible by external instrumentation. Chip designers have attacked this problem by including hardware structures such as multiplexors and counters within chip designs to collect information about process states. But the full function and flexibility of measurement previously available with external instrumentation cannot be implemented on the VLSI chip because of design constraints. Typically, the scope of performance monitoring hardware is limited to tracking a few hard-wired internal events. While the data collected by such hardware is valuable for systems analysis, there is no flexibility in scope, triggering mechanism or means to change the representation of output data. Accordingly, an improved system and method for evaluating the performance of computer systems that allows flexible empirical measurement of process states without adversely impacting system performance are desirable.

SUMMARY OF THE INVENTION

The performance monitoring system of the present invention obtains performance data about the dynamic behavior of a computer system. The invention is implemented by including counters and multiplexors on the die of a system processor to monitor specific processor states defined by a user of the present invention. The hardware is serviced by system firmware. The firmware operates in conjunction with a software layer, which includes a user interface, an operating system interface and a hardware interface. Privileged software is used to cause the processor to perform a desired function so that specific processor states can be monitored. Alternatively, firmware patching may be used to perform this function if the process does not have privileged software. Information derived in this manner is used to evaluate the performance of the computer system.

BRIEF DESCRIPTION OF THE DRAWINGS

Other advantages of the invention will become apparent upon reading the following detailed description and upon reference to the accompanying drawings, in which.

Figure 1:
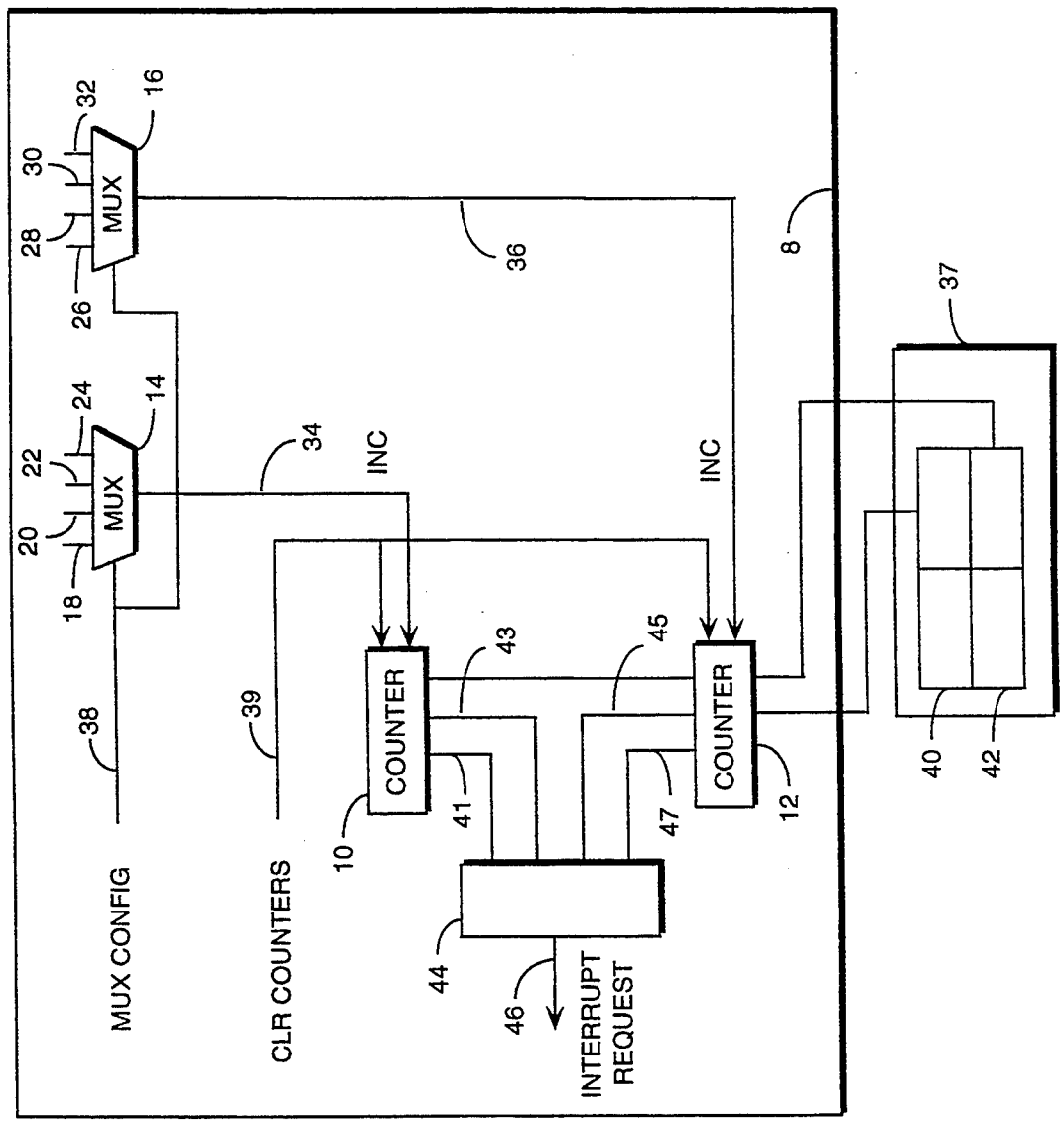
FIG. 1 is a block diagram showing a hardware layer of the present invention, which is implemented on die of a computer processor.

While the invention is susceptible to various modifications and alternative forms, specific embodiments thereof have been shown by way of example in the drawings and will herein be described in detail. It should be understood, however, that the invention is not intended to be limited to the particular forms disclosed. On the contrary, the intention of the applicant is to cover all modifications, equivalents, and alternatives falling within the spirit and scope of the invention as defined by the appended claims.

DETAILED DESCRIPTION OF THE PREFERRED EMBODIMENTS

The present invention may be implemented in connection with any computer system with any type of processor. A preferred embodiment of the invention is implemented on either the NVAX or NVAX+ microprocessor chips. Both the NVAX and NVAX+ chips are used in computer systems sold by Digital Equipment Corporation, the assignee of the present application. All references to the NVAX chip in this application apply equally to the NVAX+ chip.

The invention facilitates systems analysis by monitoring a broad range of processor states with the hardware implementation shown in FIG. 1. These events span a range from hardware state changes to transactions initiated by application software. However, the design impact of the hardware interface on system performance is minimal. The hardware interface is serviced by system firmware shown in FIG. 2. As will be appreciated by those of ordinary skill in the field, firmware includes RAM-based microcode, ROM-based microcode, patchable microcode or any privileged software, such as privileged architecture library code ("PALcode"). Firmware for the invention may be provided by any of these sources or any other known source.

Figure 3:
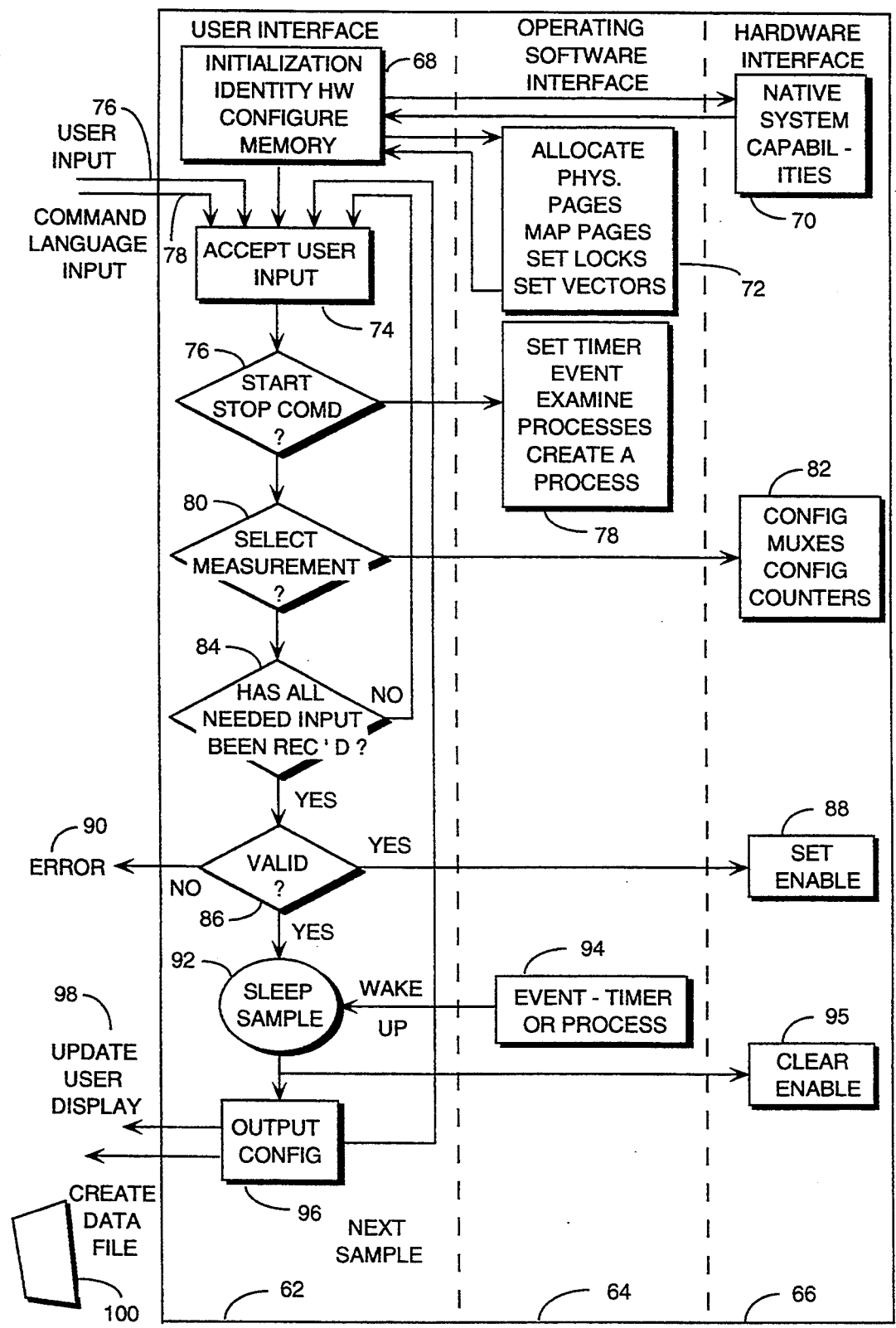
FIG. 3 is a combined flow chart and system block diagram showing the software layer of the present invention including a user interface, an operating system interface and a hardware interface, which operate in conjunction with the hardware layer shown in FIG. 1 and the firmware layer shown in FIG. 2.

Additionally, the present invention includes a software layer, shown in FIG. 3, that allows a system user to request evaluation of a specific processor state through command language instructions. The user input causes the system processor to perform the functions necessary to cause the user-defined event to occur so that it can be monitored by the system of the present invention. The events may be initiated by the processor's privileged instruction set or furnished by firmware patching if the processor does not have privileged instructions. Data obtained in this manner can be evaluated to give the user a better understanding of system performance. The performance monitoring capability of the present invention provides the flexibility to filter, consolidate, expand, or otherwise manipulate performance monitoring data in a dynamic system, with minimal impact on system behavior.

With reference to the drawings, FIG. 1 is a block diagram showing a hardware layer of the present invention, which is implemented on the die of a processor 8. The methods used to implement this hardware on the die of the processor 8 are well-known to those of ordinary skill in the art. In the preferred embodiment of the present invention, an NVAX implementation, two 16-bit counters 10, 12 are incorporated into the die of the processor 8. The counters 10, 12 count signals from a pair of multiplexors 14, 16. The counters 10, 12 obtain information about processor states in any way within the skill of those ordinarily skilled in the field. For example, the counters 10, 12 can be used to count the occurrences of signal transitions, time or other levels.

As shown in FIG. 1, each of the counters 10, 12 receives an input from one of the multiplexors 14, 16. Thus, each of the counters 10, 12 counts events coming from the output of the multiplexor associated therewith.

Each of the multiplexors 14, 16 has a plurality of inputs 18–32, each of which is connected to a hardware location in the processor. The specific hardware locations are a matter of design choice and each connection is within the ability of one of ordinary skill in the field. In FIG. 1, the multiplexor 14 is associated with inputs 18–24 and the multiplexor 16 is associated with inputs 26–32. The multiplexor 14 has an output line 34, which is connected to an input of the counter 10, and the multiplexor 16 has an output line 36, which is connected to an input of the counter 12. As will be appreciated by those of ordinary skill in the field, the multiplexors 14, 16 present one of their input signals on their output line. As will be fully explained below, the input signal presented to the outputs of the multiplexors is controlled by a multiplexor configuration signal 38. The counters 10, 12 count logic transitions, time or other levels on a specific one of the multiplexor inputs 18–32 by selecting that specific multiplexor input to be passed to the output and counting the transitions with the appropriate counter. Thus, multiplexor configuration signal 38 selects a specific hardware location in the processor to be monitored by the counters 10, 12. The specific configuration of the multiplexors is a matter of design choice and not an essential feature of the present invention. Those of ordinary skill in the art will recognize that a wide variety of known multiplexor configuration may be used.

Two 64-bit performance counter registers 40, 42 are maintained in a system memory 37. The lower 16 bits of each of the counter registers 40, 42 correspond to the 16-bit counters 10, 12, respectively. Periodically, the counter registers 40, 42 are updated with the contents of the hardware counters. The updating of the memory is fully described below with reference to FIG. 2.

As previously noted, the counters 10, 12 are configured by the system of the present invention to count any one of a basic set of processor states, such as cache access and hit, translation look aside buffer access and hit, cycle and instruction retire and cycle and stall. Those of ordinary skill in the field will appreciate that this list of events is not exhaustive and that any system event can be monitored as long as a hardware signal indicative of the processor state is connected to one of the multiplexor inputs 18–32.

The numerical value contained in the counters 10, 12 is monitored by a control circuit 44. The control circuit 44 is connected to the counters 10, 12 by a plurality of lines 41, 43, 45, 47, which transmit the contents of the counters to the control circuit 44. The specific details of the construction of the control circuit 44, including the number of lines 41, 43, 45, 47, is not an essential feature of the present invention. The construction of such a control circuit is within the ability of one of ordinary skill in the field.

When the 16-bit counters reach a half-full state, a performance monitor interrupt is requested by the control circuit 44 via an interrupt request line 46. This interrupt is serviced according to principles well-known in the field. For example, the performance monitor interrupt is subject to the interrupt hierarchy of the processor. Additionally, the performance monitor interrupt may be serviced between instructions or in the middle of interruptable instructions. Unlike other interrupts, the performance monitor interrupt is serviced entirely in firmware and dismissed. No software interrupt handler is required. In a preferred embodiment of the present invention, the firmware servicing the performance monitor interrupt updates the memory locations 40, 42 when it services the performance monitor interrupt and at the end of a measurement period of predetermined duration. This feature of the present invention is described below, with reference to FIG. 2.

During a counter update, the firmware temporarily disables counter updates, reads and clears the counters 10, 12 via a counter clear line 39. Additionally, the memory locations 40, 42 are updated based on the contents of the counters. Finally, the counters are enabled again and instruction execution resumes. The implementation of these activities are within the ability of those of ordinary skill in the field. The base address of the counters in memory is a vector taken from a system control block and offset by the specific processor number to create a data structure in memory that contains a pair of 64-bit counters per processor, or otherwise modified by any method known to those of ordinary skill in the field.

Figure 2:
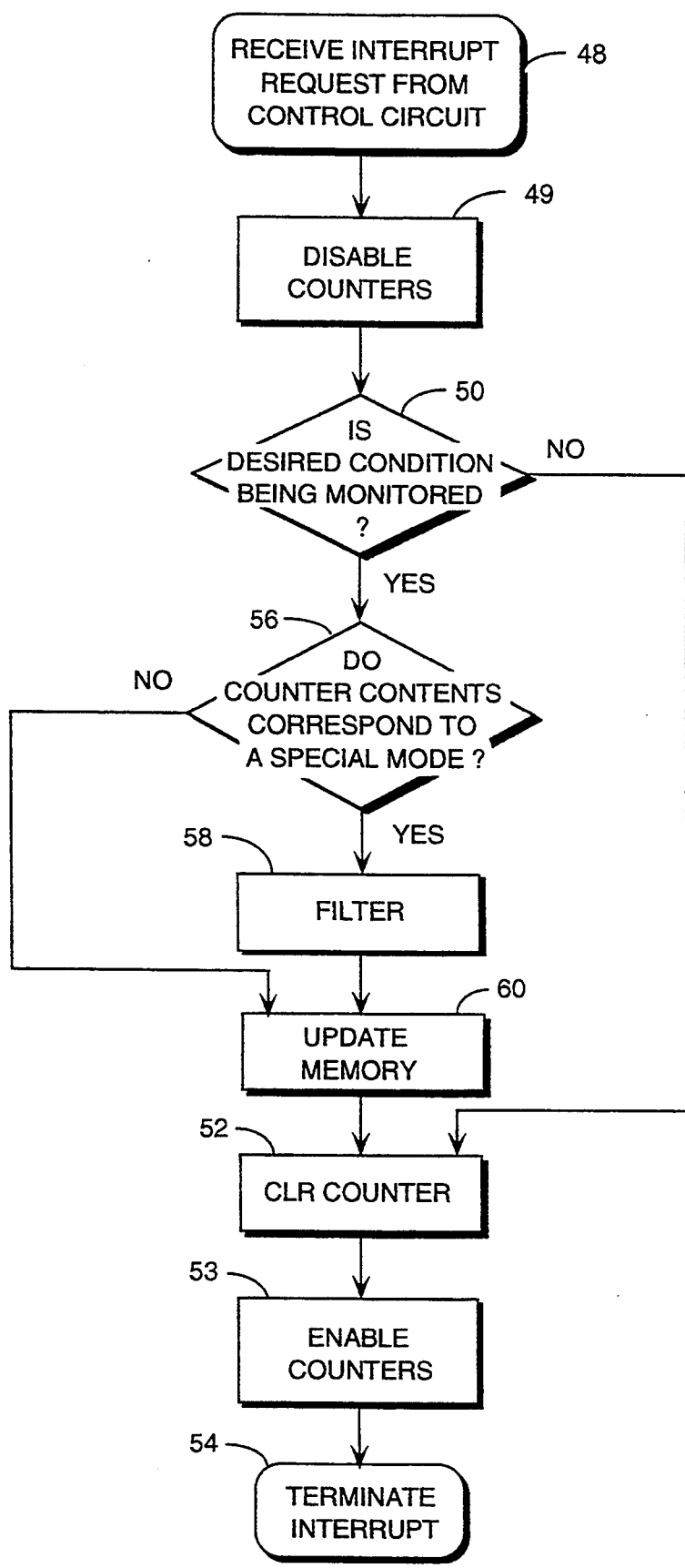
FIG. 2 is a flow chart of a firmware layer of programming that services the hardware structure shown in FIG. 1.

FIG. 2 is a flow chart of a firmware layer of programming that services the hardware structure shown in FIG. 1. The firmware layer services the performance monitor interrupt previously described. At step 48, the interrupt generated by the control circuit 44 on the interrupt request line 46 is received. The counters 10, 12 are disabled at step 49. At step 50, the firmware determines whether the processor monitored by the counters 10, 12 corresponds to a condition currently being evaluated by a user. It is possible to determine whether the processor state monitored by the counter is actually an event that is being evaluated by the user because the processor firmware has access to other aspects of processor operation. The firmware can determine whether other conditions specified by the user are met before proceeding. If a salient condition has not occurred, the counters 10, 12 are cleared at step 52 and enabled at step 53. The performance monitor interrupt is terminated at step 54.

Similarly, the firmware determines whether the counter contents correspond to a special mode at step 56. An example of a special mode is the operating mode of the processor. Because the firmware layer of the present invention can evaluate special modes, additional flexibility in evaluating system performance is provided. For example, if the user desires to evaluate a processor state that occurs while the processor is in a specific operating mode, the occurrence of the processor state is monitored by the hardware shown in FIG. 1, but the firmware determines whether the processor state occurred when the processor was in the desired mode. A substantial benefit of the present invention is that it allows a user to determine the number of occurrences of a specific processor state either with or without special modes based on a limited number of hardware measurements. The system firmware is used to determine the context in which an event occurs. In other words, the present invention gives the user great flexibility in selecting processor states to be evaluated while having a minimal impact on the hardware design of the processor.

If the firmware determines that a special mode has occurred, the counter contents are filtered at step 58. The filter allows a user of the system to either ignore the contents of the counters 10, 12 depending on whether the special event is supposed to be counted for a particular evaluation. If the special mode is of interest, the contents of the counter are not filtered (or excluded) from the event count registered by the counter. After the filtering operation of step 58, the contents of the memory are updated with the counter value that was not excluded by the filter at step 60. In performing the memory update, the value from the counters is added to the value stored in memory. Thus, the counter range is limited only by the 64-bit resolution of the memory locations 40, 42, and not the 16-bit resolution of the counters 10, 12.

As shown in FIG. 2, the memory update of step 60 is performed immediately following step 56 if the firmware determines that a special mode has not occurred. Regardless of whether a special mode has occurred, program flow following the memory update of step 60 proceeds to step 52 where the counters are cleared. Finally, the performance monitor interrupt is terminated at step 54.

FIG. 3 is a combined flow chart and system block diagram showing the software layer of the present invention including a user interface 62, an operating system interface 64 and a hardware interface 66, which operate in conjunction with the hardware layer shown in FIG. 1 and the firmware layer shown in FIG. 2. The user interface 62 performs various housekeeping functions 68 when activated. These functions include initialization, hardware identification and memory configuration. These aspects of the present invention are well-known to those of ordinary skill in the field.

The housekeeping functions 68 interact with the other system layers. For example, at step 70, identification of hardware determines the capabilities of the system. Additionally, at step 72, the operating system interface 64 allocates physical pages in memory, maps pages, sets locks to prevent other processes from accessing specific pages of system memory and defines interrupt vectors. The execution and purpose of these functions is well-known to those of ordinary skill in the field.

After the housekeeping functions have been performed, the user interface 62 accepts user input at step 74. Many methods such as a window interface or a command file are known in the field. The use of a specific user interface is not an essential feature of the invention.

The user input defines the processor state or states to be monitored as previously described. For example, the user may input information specifying a command language file to be used for an evaluation. In the context of the present invention, the command language relates to a specific set of instructions to be executed to cause the processor to execute a desired function for evaluation purposes.

At step 76, the user interface 62 determines whether the user input information received at step 74 corresponds to a starting or stopping condition. Responsive to this determination, the operating system interface 64, at step 78, prepares to monitor the specified event by interrogating the system to determined what processes are running. If needed, asynchronous traps are set or new processes are started to cause the process state being monitored by the user to occur.

At step 80, the user interface 62 selects the measurement that corresponds to the processor state the user wishes to be evaluated. The hardware interface 66 uses privileged instructions to configure the system hardware at step 82. Specifically, the counters 10, 12 (FIG. 1) and multiplexors 14, 16 (FIG. 1) are configured by the multiplexor configuration signal 38 (FIG. 1) to monitor the appropriate hardware location in the processor.

Returning to the operation of the user interface 62, step 84 determines whether additional user input is required. If so, program flow returns to step 74 and more user input is accepted. If no more input is needed, execution proceeds to step 86, where the user interface 62 determines whether the information input by the user corresponds to a valid event that the system of the present invention is capable of measuring. If the event sought to be measured by the user is valid (i.e. capable of being measured by the system), the hardware interface 66 is enabled at step 88. If the event sought to be measured is not valid, an error message 90 is generated and execution terminates.

After the hardware interface 66 enables the counters, the user interface 62 goes into an inactive state at step 92. As shown at step 94, the occurrence of the stop conditions triggers a wake up signal from the operating system interface 64. At step 95, the hardware interface enable that was set in step 88 is cleared.

After receiving the wake up signal from the operating system interface 64, the user interface 62 configures its output of the results of the monitoring cycle at step 96. As shown in FIG. 3, the output configuration may take the form of updating the display 98 or creating a data file 100. Finally, program flow proceeds to step 74 where user input is received for another measurement.

In general, the ability to set up a versatile performance monitoring environment requires performance monitoring hardware in the processor to count the basic events, such as the events noted above, and a way to change the base hardware functions of the machine through firmware or software from privileged architecture libraries, which catalog privileged instructions. As will be appreciated by those of ordinary skill in the field, privileged instructions control internal operations of the processor. Privileged software can access internal processor registers and device registers of the processor. The execution of privileged instructions is transparent to the external operation of the processor. In the present invention, a system user affects the hardware interface by firmware patching.

As previously noted, the present invention exploits the processor's privileged instruction or firmware patching to introduce flexibility into the process of computer system evaluation. If the processor does not have a privileged instruction set, firmware patching is used to transfer machine language instructions from the software level of the present invention to the processor to cause the processor to execute a sequence of instructions desired by the user. As will be recognized by the skilled in the field, any known method of performing firmware patching may be used. The exact method of accomplishing firmware patching is not an essential feature of the present invention.

The following examples are potential uses of the present invention. The implementation of these examples is within the ability of those of ordinarily skill in the field, given the disclosure of the invention contained herein.

EXAMPLE 1

Firmware enables the system of the present invention every time a process context is loaded and disables the system when a process context is saved. Then, higher level software sets up workloads and gathers dynamic statistics on a per process basis.

EXAMPLE 2

The memory counter address is modified by firmware to provide an additional offset based on processor operating mode. In this way, a new performance counter data structure is formed in memory that collects statistics on a per operating mode, per process, per processor basis.

EXAMPLE 3

Firmware patches alter the base machine firmware to add context checks that filter and count various events. A privileged VAX instruction is patched so that the number of process context switches can be counted. Similarly, the number and types of accesses to multiprocessor synchronization locks can be counted.

EXAMPLE 4

Firmware places an additional state in the counter data structure that high level software can extract and accumulate in real time. A trace can be obtained in this way. A particular number of events, such as a number of machine cycles, is used to create the performance interrupt. During the performance monitoring interrupt service routine, firmware stores away states in the counter data structure. A user process monitors the data structure and moves new trace data to a file on disk.

The system of the present invention minimizes design impact. The base set of events covered by the performance monitoring hardware and its limited functions keep it small in size. Events are captured by hardware in real time, so negligible performance artifact is introduced during the counting. The system is disabled during the performance interrupt service so that only a minimal performance artifact is introduced by memory counter updates.

Thorough understanding of system performance provides the background needed to make the hardware and software design decisions required to deliver the optimum system performance. The system and method of the present invention allow the collection the data needed to analyze system behavior to understand system performance.

Thus, there has been described herein a computer system performance evaluation system and method. It will be understood that various changes in the details, arrangements and configurations of the parts and system which have been described and illustrated above in order to explain the nature of the present invention may be made by those skilled in the art within the principle and scope of the present invention as expressed in the appended claims.

What is claimed is:

1. A system for evaluating the performance of a computer system having a processor that passes through a plurality of processor states during operation, said processor having a system memory associated therewith, comprising:

an operating system that receives a request to monitor specific ones of said process states from a user;

firmware for causing said processor to enter said specific ones of said plurality of processor states based on said request;

at least one multiplexor disposed on the die of said processor for monitoring a specific location on the die of said processor, said specific location corresponding to said request to monitor said specific ones of said processor states;

at least one counter disposed on the die of said processor, said counter receiving an input from said multiplexor corresponding to said specific ones of said plurality of processor states, said counter noting the occurrence of said specific ones of said processor states when said specific ones of said processor states occur;

at least one storage location in said memory for accumulating information from said counter, which notes the occurrence of said specific ones of said processor states; and output means for reading accumulated information from said memory and for providing a report of said accumulated information to said user.

2. The system of claim 1 wherein said counter is serviced by said firmware to accumulate said information which notes the occurrence of said specific ones of said processor states in said at least one storage location.

3. The system of claim 1 wherein said user request is received from a command language file.

4. The system of claim 1 wherein said firmware for causing said processor to enter said specific ones of said plurality of processor states comprises privileged firmware.

5. The system of claim 1 further comprising means for patching firmware instructions to said processor to cause said processor to enter said specific ones of said plurality of processor states.

6. A method of evaluating the performance of a computer system having a processor that passes through a plurality of processor states during operation, said processor having a system memory associated therewith, and at least one multiplexor disposed on the die of said processor, said method comprising the steps of:

receiving a request to monitor specific ones of said processor states from a user;

causing said processor to enter said specific ones of said plurality of processor states based on said request;

monitoring a specific location on the die of said processor, said specific location corresponding to said request to monitor said specific ones of said plurality of processor states;

receiving an input from said multiplexor corresponding to said specific ones of said plurality of processor states identified by said user request from said plurality of processor states being monitored;

noting the occurrence of said specific ones of said plurality of processor states when said specific ones of said plurality of processor states occur;

accumulating information from said selected inputs which notes the occurrence of said specific ones of said processor states in said memory;

reading said accumulated information from said memory; and providing a report of said accumulated information to said user.

7. The method of claim 6 wherein said step of causing said processor to enter said specific ones of said plurality of processor states is initiated by privileged firmware.

8. The method of claim 6 wherein said step of causing said processor to enter said specific ones of said plurality of processor states is initiated by patching firmware to said processor.

* * * * *